(12) United States Patent
Barnel et al.

(10) Patent No.: US 10,664,206 B2
(45) Date of Patent: May 26, 2020

(54) PRINT-MODE CONFIGURATION SELECTION

(71) Applicant: Hewlett-Packard Development Company, L.P., Houston, TX (US)

(72) Inventors: Frederic Barnel, Sant Cugat del Valles (ES); Oriol Borrell Avila, Sant Cugat del Valles (ES); Albert Crespi Serrano, Sant Cugat del Valles (ES)

(73) Assignee: Hewlett-Packard Devleopment Company, L.P., Spring, TX (US)

( * ) Notice: Subject to any disclaimer, the term of this patent is extended or adjusted under 35 U.S.C. 154(b) by 0 days.

(21) Appl. No.: 16/302,139

(22) PCT Filed: Jul. 29, 2016

(86) PCT No.: PCT/US2016/044665
§ 371 (c)(1),
(2) Date: Nov. 16, 2018

(87) PCT Pub. No.: WO2018/022084
PCT Pub. Date: Feb. 1, 2018

(65) Prior Publication Data
US 2019/0286386 A1    Sep. 19, 2019

(51) Int. Cl.
*H04N 1/00* (2006.01)
*G06F 3/12* (2006.01)
(Continued)

(52) U.S. Cl.
CPC .......... *G06F 3/1208* (2013.01); *G06F 3/1204* (2013.01); *G06F 3/1231* (2013.01);
(Continued)

(58) Field of Classification Search
CPC .... G06F 3/1208; G06F 3/1294; G06F 3/1231; G06F 3/1256; G06F 3/1204; G06F 3/1288; H04L 67/1097
(Continued)

(56) References Cited

U.S. PATENT DOCUMENTS

| 7,190,467 B2 | 3/2007 | Simpson et al. |
| 8,705,125 B2 | 4/2014 | Mori |

(Continued)

OTHER PUBLICATIONS

Nguyen, T. et al., "Compaq Quicksource: Providing the Consumer with the Power of Artificial Intelligence," IAAI-93 Proceedings.

*Primary Examiner* — Saeid Ebrahimi Dehkordy
(74) *Attorney, Agent, or Firm* — HP Inc. Patent Department

(57) ABSTRACT

A system includes an image analyzer to analyze an image to be printed by a printer and to obtain an image parameter of the image, and a database to store a plurality of print-mode configurations for the printer. Each print-mode configuration has associated therewith a measure that represents a suitability of the print-mode configuration to print an image having a certain image parameter on a certain print medium. The database receives a query, and the query indicates the image parameter and a print medium. The database selects, responsive to the query and to the measure, a print-mode configuration for the printer, and outputs the selected print-mode configuration. The system modifies the measure associated with the selected print-mode configuration in response to a feedback about the printed image.

20 Claims, 5 Drawing Sheets

(51) Int. Cl.
*H04L 29/08* (2006.01)
*H04N 1/60* (2006.01)

(52) U.S. Cl.
CPC .......... *G06F 3/1256* (2013.01); *G06F 3/1257* (2013.01); *G06F 3/1285* (2013.01); *G06F 3/1294* (2013.01); *H04L 67/1097* (2013.01); *H04N 1/6047* (2013.01); *H04N 1/6097* (2013.01); *G06F 3/1288* (2013.01)

(58) Field of Classification Search
USPC ...................................................... 358/1.13
See application file for complete search history.

(56) References Cited

U.S. PATENT DOCUMENTS

| | | |
|---|---|---|
| 9,071,777 B2 | 6/2015 | Kazama |
| 9,216,591 B1 | 12/2015 | Rozier et al. |
| 2007/0165258 A1 | 7/2007 | Farrell et al. |
| 2010/0033736 A1 | 2/2010 | Triplett et al. |
| 2015/0077800 A1 | 3/2015 | Yamagishi et al. |
| 2015/0095772 A1 | 4/2015 | Kuranoshita |
| 2017/0068875 A1* | 3/2017 | Gerrits ............... G06K 15/1836 |

* cited by examiner

PRINT-MODE CONFIGURATION SELECTION

BACKGROUND

For printing on a printer, for example an electrostatic printer, an inkjet printer or a three-dimensional printer, a user may set a printer configuration, and the printer uses the printer configuration for printing.

DETAILED DESCRIPTION

Figure 1:
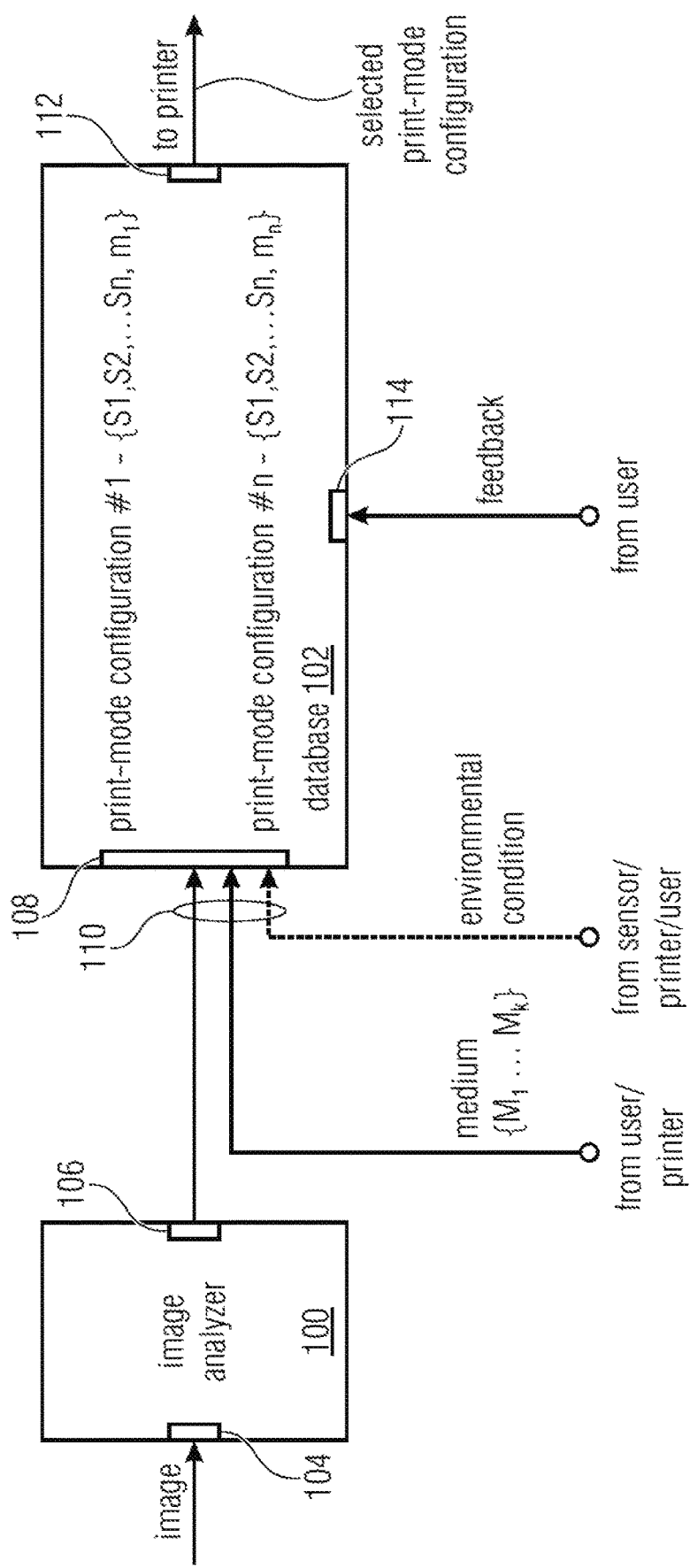
FIG. 1 illustrates a schematic block diagram of a system for selecting a print-mode configuration in accordance with an example.

For printing an image, a printer uses a printing material and may offer a predefined set of parameters that may work for most combinations of images and media. In accordance with examples, the printing material may include ink, like a solvent ink or a latex ink. In other examples, the printing material may be a toner material. The set of parameters is also referred to as a print-mode configuration. For non-experienced users it may be difficult to fine-tune the print-mode configuration. The print-mode configuration to be used depends on the medium, the image content and—in some cases—environmental conditions like temperature and humidity. For example, the print-mode configuration selection may be different when printing an image with a high density or an image with a low density. The expertise for managing correctly a printer to obtain a print-mode configuration for printing a certain image on a certain medium at a given quality is not trivial and may be difficult for users. Also this may add to the operating costs, for example in terms of time spent by the user to set up the printer for printing a desired image.

A print-mode configuration may include, for a given printer, a set of parameters S1, S2 . . . Sn. In accordance with examples, a print-mode configuration may include a single parameter. For example, in an inkjet printer the parameters may indicate the number of passes and the curing temperature. For example, printing on textile media may include a number of passes and a curing temperature that is higher when compared to printing on plain paper. The number of passes indicates how many times the printer prints over the same zone or area, for example by moving a carriage of the printer holding printheads multiple times over the same zone. More passes, in general, mean more quality at less printing speed. The curing temperature indicates the temperature or energy to cure the image, also referred to as a plot. A low temperature may not sufficiently cure the plot, but a high temperature may damage the medium, also referred to as a substrate. The curing temperature may depend on the density of the plot and the substrate. In addition to the number of passes and the curing temperature, the parameters may further include the ink density, the printing resolution and the ICC profile, ICC=International Color Consortium. The ink density may indicate the amount of ink to be fired on the medium. More ink means more color gamut, but the plot may be cured at a high temperature and, further, the substrate may deform when the amount of ink increases, for example, the substrate may curl. The printing resolution indicates the level of detail. For example, text images a may be printed with a higher resolution, but in non-text images a high resolution may reduce the quality of the overall image, as image defects may become visible. The ICC profile describes the color response of the ink in the medium and may be used to modify the input image in order to obtain accurate colors in the printed image.

As mentioned above, selecting a suitable print-mode configuration for a printer may be complex due to the complexity of the printing process itself and the large set of media supported. To ease the use of printers, print-mode configurations may be provided by a printer manufacturer or a print service provider so that for certain media that may be processed by the printer a number of print-modes for each media is provided. For example, such information, also referred to as media packages, may be uploaded to a server so as to allow a user to download a media package for use with the printer. Although providing the media packages allow the user to print without in-depth knowledge of the correct configuration, since the available print-mode configurations try to cover all possible images, the result is a compromise.

Examples of the techniques described herein increase the ease of using printers, by reducing the expertise for obtaining good printouts of an image without the user knowing the correct configuration for a certain media on which a certain image is to be printed.

FIG. 1 is a schematic block diagram of a system in accordance with an example. The system includes an image analyzer 100 and a database 102.

The image analyzer 100 receives at an input 104 an image, for example from a user. In accordance with examples, the image is provided to the image analyzer 100 as image data representing the image to be printed by a printer. The image analyzer 100 analyzes the image data so as to obtain an image parameter of the image. The image parameter obtained by the image analyzer 100 is provided at an output 106. In accordance with examples, a plurality of image parameters may be obtained by the image analyzer 100 from the image supplied to the image analyzer at the input 104.

The database 102 stores a plurality of print-mode configurations #1 . . . #n. Each print-mode configuration includes, for a given printer, the set of parameters S1, S2 . . . Sn and has associated therewith a measure $m_1 \ldots m_n$ indicating or representing a suitability of the print-mode configuration to print an image having a certain image parameter on a certain print medium.

The database 102 includes a first input 108 at which a query is received which is schematically represented in FIG. 1 at 110. The query 110 includes the image parameter provided by the image analyzer 100 as well as information about the medium $M_1 \ldots M_k$ on which the image is to be printed. The information about the medium may be provided by the user or by the printer. Using the query received at the first input 108 and using the measures $m_1 \ldots m_n$ the database selects a print-mode configuration suitable for printing the image having the image parameter on the medium indicated in the query 110, and outputs the selected print-mode configuration at an output 112. The selected print-mode configuration provided by the database 102 may be send to a printer for printing the image. In accordance with examples, the query may be generated by the image analyzer 100 or by the printer.

The database 102 includes a second input 114 to receive a feedback, for example from the user, about the printed image, and using the information received at the second input 114, the measure of the selected print-mode configuration is modified in response to the feedback. In accordance with examples, the feedback provided to the database 102 may include a new value for the measure associated with a certain print-mode configuration so that the database 102, responsive to the received feedback, updates the stored measure. The new value may be determined by the entity receiving the user's information about the printed image, e.g. by the image analyzer or by the printer. In accordance with other examples, the user's information about the printed image may be forwarded to a remote entity, e.g. a Cloud application, which determines the new value and forwards the new value to the database. In accordance with other examples, the database may have a data processing capacity, e.g. when the database is implemented in a server device or as a Cloud application. The user's information about the printed image is forwarded to the database which determines the new value and uses the new value for updating the measure.

In accordance with examples, the image analyzer 100 may perform an image density analysis while ripping the image to determine, for example a range of the maximum density of the overall image or a part of the image. For example, an image may be split into a number of cells and a histogram of ink density using the number of pixels including data may be computed so as to obtain the ink density to be used for printing.

The database 102 may be a Cloud service to perform a matching between the medium and the image analysis results and output the selected print-mode configuration. User data after printing the image may be gathered and supplied to the database 102. The user data may include a feedback indicating that the selected print-mode configuration was a good choice or was not a good choice for printing the image, and using the feedback from the user the database 102 and the measures associated with the selected print-mode configuration may be modified in response to the user feedback. In accordance with examples, depending on the user feedback supplied to the database 102, the measure m may be increased in case the user feedback indicates a good quality of the printed image, and the measure m may be decreased in case the user feedback indicates a bad quality of the print image.

In accordance with further examples, the query 110 may also include information about the environmental conditions for printing, for example about the humidity and the temperature, that may be provided and input by a sensor or by the printer. In accordance with other examples, the additional information about the environmental condition may also be input by the user.

In the system as described in the example of FIG. 1 a user does not select a specific print-mode configuration for printing an image on a printer. The user provides the image to be printed, which is then analyzed, and the result of the image analysis, for example the average density of pixels in the image, as well as an indication of the medium to be used by the printer, is used to query a database holding the plurality of print-mode configurations available for the printer. For example, the database holds a plurality of possible print-mode configurations for printing an image having a certain image parameter on a certain medium, as well as an indication how suitable the print-mode configuration is for printing. Using the image parameters found by the analysis, the print medium and the measure, the database returns a print-mode configuration for the printer. Following the print process, data is gathered to allow a user to indicate whether the selected or chosen print-mode configuration was a good one or not. Using the user feedback the measure associated with the print-mode configuration is updated. By gathering user feedback from many users the selection of print-mode configurations may be enhanced and individual human errors may be minimized. To allow for the feedback from many different users, the database may be located in a Cloud application so as to be accessible from various sites using the printer.

In accordance with the system described with reference to FIG. 1, a user may easily obtain prints with a good quality in printers. The database 102 may be accessible by a plurality of users having the same or a similar printer so that all users may collaborate to update the database with regard to the ranking of the print-mode configurations in terms of user satisfaction. For example, the database may be provided as a Cloud application or may be provided on a server accessible by users of the printer. This allows gathering a high volume of feedback across various users, for example from the same region or from different regions, which allows to minimize a human error factor when assessing a print-mode configuration for a given medium, for example by a visual analysis of the printed image. In accordance with examples this may characterize the image quality differently for different regions of the globe.

The database may apply any procedure to select or choose the print-mode configuration using the input parameters. For example, a feed-forward neural network or a selection tree may be used. The feed-forward neural network may have a learning capability using the feedback or satisfaction with the selected print-mode configuration. The selection tree may be implemented in the database 102 and use satisfaction votes provided via the feedback. For example, a list of print-mode configurations that are ordered by user satisfaction may be obtained by going through a tree using the input parameters indicated in the query. The order is updated using the feedback received at the database 102, and the print-mode configuration with the highest user satisfaction may be selected.

Figure 2:
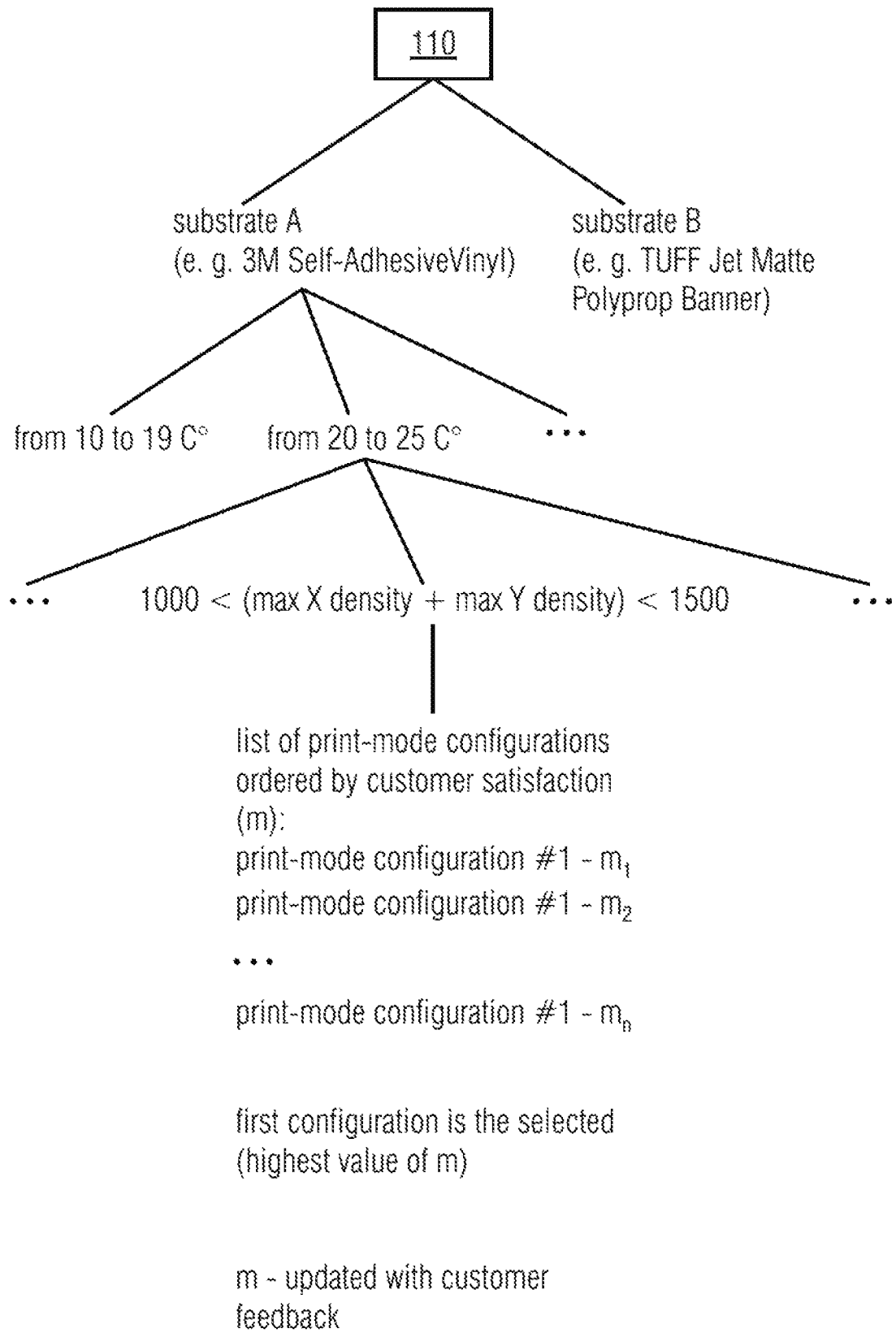
FIG. 2 illustrates an example of tree based selection of a print-mode that may be implemented in the database.

FIG. 2 is an example of tree based selection of a print-mode that may be implemented in the database 102. Using the query 110 indicating a medium for printing, an environmental condition and an image parameter a list of print-mode configurations is obtained. In the example of FIG. 2, at a first level of the selection tree a decision with respect to the medium is made. For example a decision between substrate A and substrate B is possible, and it is assumed that the query 110 indicates substrate A. At the second level of the decision tree, a decision with respect to the environmental condition indicated in the query 110 is made. The environmental condition is the temperature and it is indicated in the query that the temperature is between 20° C. and 25° C. In the third level of the decision tree, a decision depending on the image parameter included in the query 110 is made. In the example depicted, the sum of the maximum densities in the X direction and the Y direction of the image—analyzed via breaking the image into cells and computing an histogram for example—is indicated to be between 1000 and 1500, for example using the number of pixels indicating data, i.e. non-white pixels, in a certain region of the image or in the entire image to be printed. Thus, when printing an image or an area of an image having a sum of the maximum density in the X and Y direction being between 1000 and 1500 that is to be printed on a substrate A at a temperature between 20° C. and 25° C., a list of print-mode configurations is obtained. The list may be ordered by the customer satisfaction, and the print-mode configuration with the highest value m, in the example the first configuration, may be selected. The value m representing the customer or user satisfaction with the print-mode configuration m is updated with the user feedback following the print process.

Figure 3:
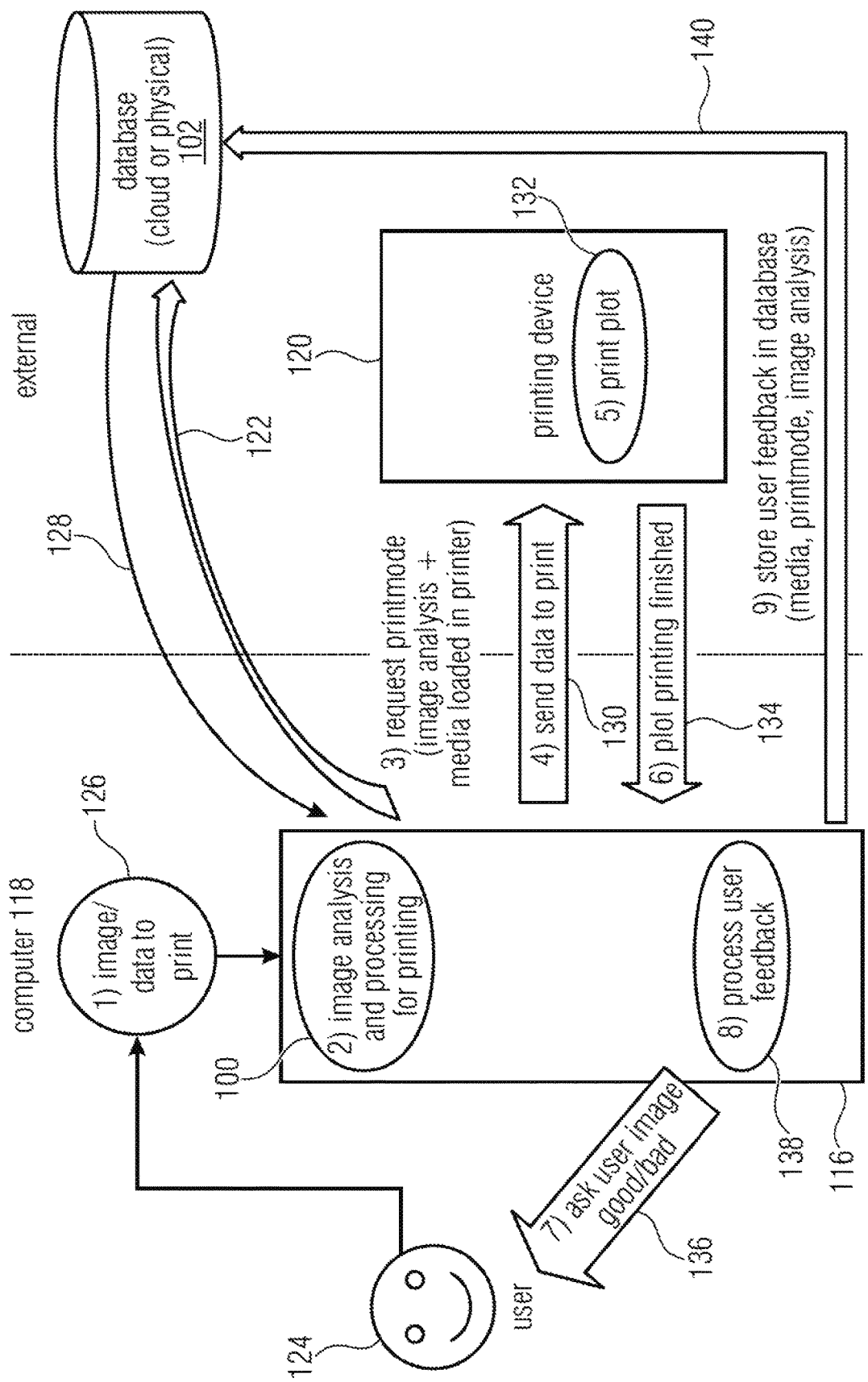
FIG. 3 illustrates a schematic block diagram of a system for selecting a print-mode configuration in accordance with an example including a printer driver having the image analysis and a printer separate from each other.

FIG. 3 shows a schematic block diagram of the system in accordance with an example including the printer. In the system of FIG. 3 a printer driver 116 is shown as part of a computer 118. The printer driver 116 includes the image analyzer 100. The system further includes a printer or printing device 120. In the example of FIG. 3, the printer 120 is external from the computer 118 and is connected to the printer driver 116. Further, the database 102 is located external to the computer 118 and external to the printer 120 at a remote location. In accordance with examples, the database 102 may be a Cloud application or may be provided by a physical server accessible by the printer driver 116 as indicated as 122. A user 124 provides, via the computer 118, the image 126 or the image data to be printed to the printer driver 116. The image analyzer 100 analyzes the image 126 and, in accordance with examples, may also perform the processing for having the image printed. A query or request is generated at the printer driver 116 and is sent to the database 102. The query indicates the results of the image analysis as well as the medium loaded in the printer 120. In response to the query the database returns at the selected print-mode configuration to the printer driver 116, as is indicated at 128. At 130 the data to be printed is sent to the printer 120 together with the selected print-mode configuration for setting up the printer 120 for printing the image. The printer 120 prints the image or plot as indicated at 132, outputs the printed plot and returns an information that the plot printing is finished to the printer driver 116, as is indicated at 134. The printer driver 116 issues a request to the user 124 as is indicated at 136 so as to ask the user as to whether the printed image is of good quality, and at 138 the printer driver processes the user feedback and outputs the user feedback to the database 102 as indicated at 140. The database 102 stores the user feedback in combination with the selected print-mode configuration.

In accordance with examples, the query may be generated by the printing device, e.g., using the image analysis received from the image analyzer and the information about the medium loaded into the printing device. The printing device may forward the query to the database, and may receive from the database the selected print-mode configuration.

FIG. 3 shows an example in which the database 102 is external to the printing device 120 and external to the computer 118. In accordance with other examples, the database may be part of the computer 118 or may be part of the printer 120.

Figure 4:
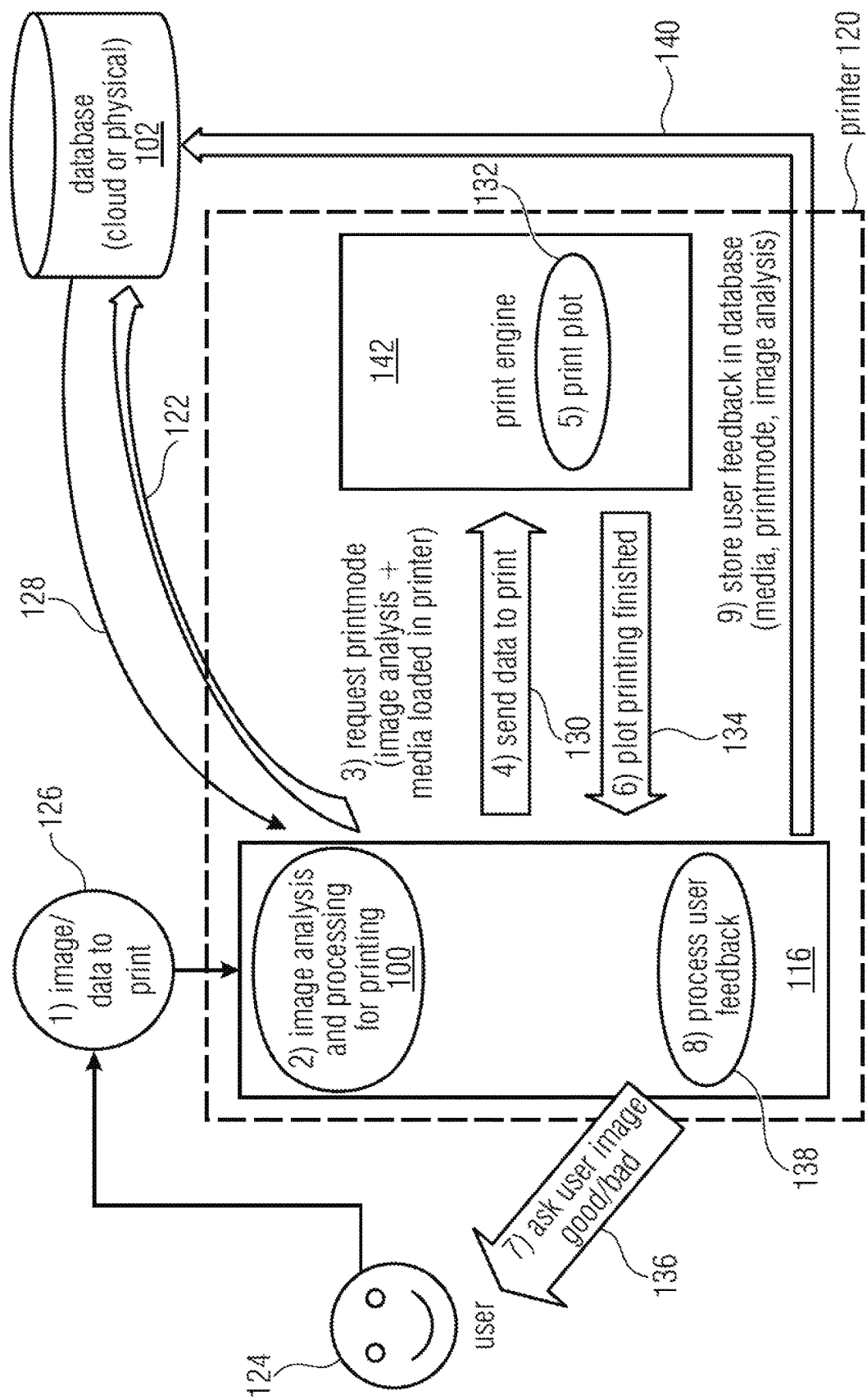
FIG. 4 illustrates a schematic block diagram of a system for selecting a print-mode configuration in accordance with an example including a printer driver having the image analysis included in a printer separate.

FIG. 4 shows a system for obtaining a print-mode configuration in accordance with another example. The example described in FIG. 4 corresponds substantially to the example of FIG. 3, except that the printer driver 116 is part of the printer 120. The image 126 may be provided to the printer driver 116 from an external source, such as a computer. The printer 120 includes the print engine 142 performing the actual print job using the data to be printed and the selected print-mode configuration. The database 102 is shown as an external device, however, in accordance with other examples, it may also be part of the printer 120.

Figure 5:
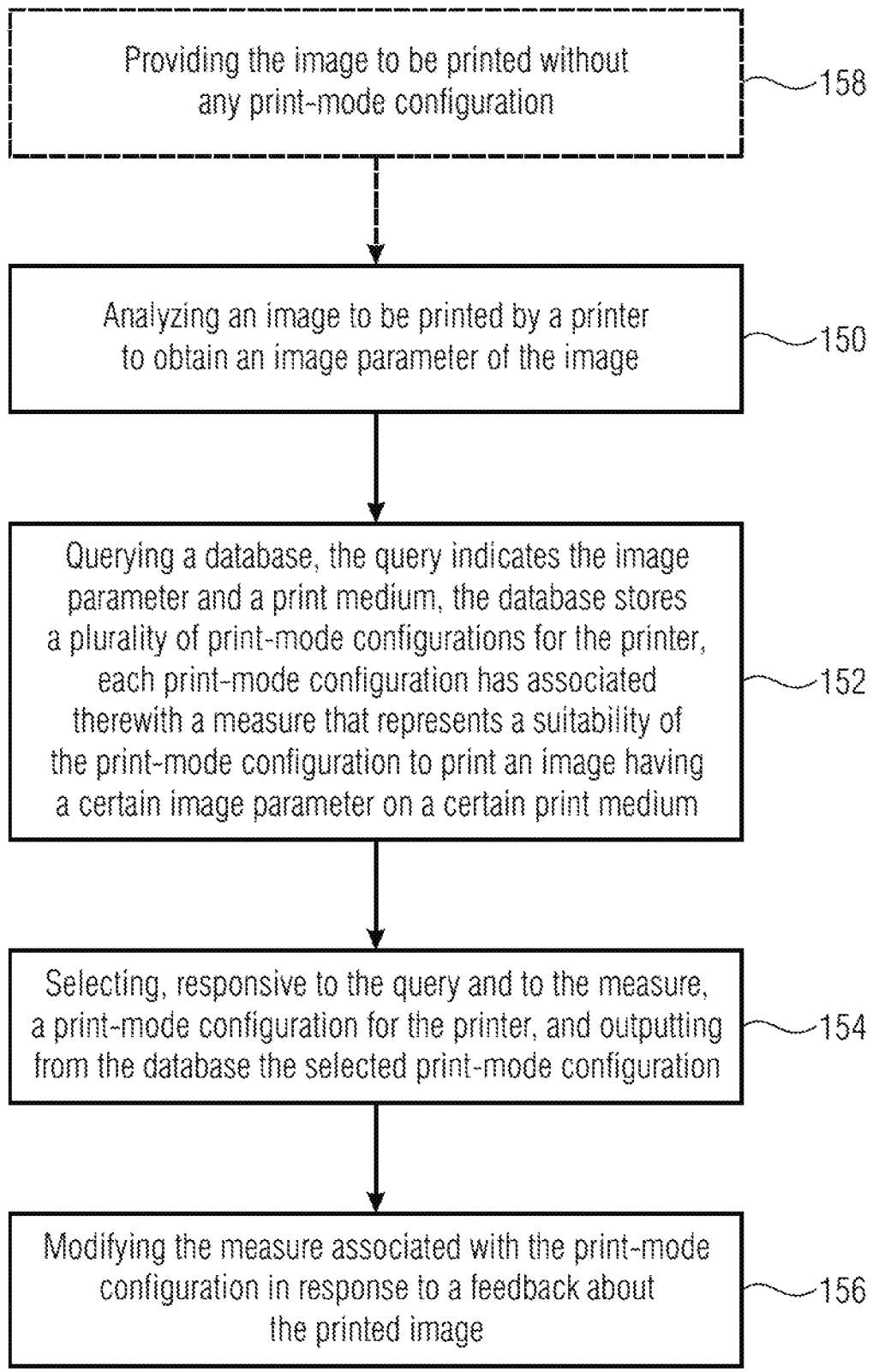
FIG. 5 is an example of a method for obtaining a print-mode configuration in accordance with an example.

FIG. 5 is an example of a method for obtaining a print-mode configuration in accordance with an example. Initially, as is indicated at 150, an image by a printer is analyzed to obtain an image parameter of the image. At 152 a database is queried. The query indicates the image parameter and a medium to be used for printing. The database stores a plurality of print-mode configurations for the printer. Each print-mode configuration has associated therewith a measure that represents a suitability of the print-mode configuration to print an image having a certain image parameter on a certain medium. At 154, responsive to the query and to the measure, a print-mode configuration for the printer is selected, and a selected print-mode configuration is output from the database. At 156 the measure associated with the print-mode configuration is modified in response to a feedback about the printed image.

In accordance with examples, the method may include, at 158, providing the image to be printed. In accordance with examples, the user provides the image or data representing the image to the system without any indication of a print-mode configuration to be used for printing. The print-mode configuration is selected as described above without user interaction or automatically using the image analysis results and the medium information.

The examples described above referred to an inkjet printer, for example an inkjet printer using as a printing material a solvent ink or a latex ink. In accordance with other examples, the printer may be an electrostatic printer, like a laser printer, using as a printing material a toner material.

In the examples described above a print-mode configuration is selected for printing an image on a printer, which may also be referred to as a two-dimensional or 2D printer. In accordance with other examples, a print-mode configuration may be selected as described above for a printer used in a three-dimensional or 3D printing process, also referred to as additive manufacturing process, for the generation of three-dimensional objects layer-by-layer.

Although some aspects of the techniques described herein have been described in the context of an apparatus, these aspects may also represent a description of the corresponding method, where a block or device corresponds to a method block or a feature of a method block. Analogously, aspects described in the context of a method also represent a description of a corresponding block or item or feature of a corresponding apparatus.

Examples described herein may be realized in the form of hardware, machine readable instructions or a combination of hardware and machine readable instructions. Any such machine readable instructions may be stored in the form of volatile or non-volatile storage, for example, a storage device such as a ROM, whether erasable or rewritable or not, or in the form of a volatile memory, for example, RAM, memory chips device or integrated circuits or an optically or magnetically readable medium, for example, a CD, DVD, magnetic disc or magnetic tape. The storage devices and storage media are examples of machine readable storage that is suitable for storing a program or programs that, when executed, implement examples described herein.

All of the features disclosed in this specification, including any accompanying claims, abstract and drawings, and/or all of the method or process so disclosed may be combined in any combination, except combinations where at least some of the features are mutually exclusive. Each feature disclosed in this specification, including any accompanying claims, abstract and drawings, may be replaced by features serving the same, equivalent or similar purpose, unless expressly stated otherwise. Thus, unless expressly stated otherwise, each feature disclosed is one example of a generic series of equivalent or similar features.

The invention claimed is:

1. A system, comprising:
   a computer processor; and
   a non-transitory storage medium storing instructions executable on the computer processor to:
   analyze an image to be printed by a printer, and obtain an image parameter of the image based on the analyzing;
   send a query to a database that stores a plurality of print-mode configurations for the printer, each respective print-mode configuration of the plurality of print-mode configurations having associated therewith a respective measure that represents a suitability of the respective print-mode configuration to print an image having a corresponding image parameter on a corresponding print medium, wherein the query indicates the image parameter and a print medium;
   receive, from the database responsive to the query, a selected print-mode configuration for the printer, the selected print-mode configuration selected by the database from the plurality of print-mode configurations based on the image parameter and the print medium indicated by the query and based on comparing relative values of the measures associated with the plurality of print-mode configurations; and
   modify the measure associated with the selected print-mode configuration in response to a feedback about a printed image printed by the printer using the selected print-mode configuration.

2. The system of claim 1, wherein the feedback is a user feedback, and the instructions are executable on the computer processor to:
   increase a value of the measure associated with the selected print-mode configuration in response to the user feedback indicating a first quality of the printed image; and
   decrease the value of the measure associated with the selected print-mode configuration in response to the user feedback indicating a second quality of the printed image, wherein the first quality is better than the second quality.

3. The system of claim 1, wherein the database includes a feed-forward neural network or a selection tree to select a print-mode configuration for the printer.

4. The system of claim 1, comprising a printer driver that includes the instructions.

5. The system of claim 4, wherein the printer driver includes the database, or wherein the database is separate from the printer driver.

6. The system of claim 1, comprising the printer, wherein the printer includes the computer processor and the non-transitory storage medium storing the instructions.

7. The system of claim 1, wherein the database is accessible as a cloud service.

8. The system of claim 1, wherein the database is initially provided by a printer manufacturer or a print service provider.

9. The system of claim 1, wherein the query further indicates an environmental condition for a print process to print the image.

10. The system of claim 1, wherein each print-mode configuration of the plurality of print-mode configurations includes print-mode parameters that define any or a combination of:
    a number of passes that indicates how many times the printer prints over a same zone,
    an amount of printing material applied to a print medium,
    a printing resolution,
    an International Color Consortium (ICC) profile, or
    an energy to cure a printed image.

11. The system of claim 1, wherein the database is to store print-mode parameter values for a plurality of printers, and wherein the query further indicates the printer to be used to print the image.

12. The system of claim 1, wherein the respective measure associated with each respective print-mode configuration of the plurality of print-mode configurations represents user satisfaction with use of the respective print-mode configuration to print an image having the corresponding image parameter on the corresponding print medium,
    wherein the modifying of the measure associated with the selected print-mode configuration produces a modified measure that represents a different user satisfaction.

13. The system of claim 1, wherein the measure associated with the selected print-mode configuration has a highest value from among multiple print-mode configurations of the plurality of print-mode configurations that satisfy the query, the multiple print-mode configurations being a subset of the plurality of print-mode configurations, and the comparing comprises comparing the relative values of the measures associated with the multiple print-mode configurations.

14. A printer, comprising:
    a print engine;
    a computer processor; and
    a non-transitory storage medium storing instructions executable on the computer processor to:
    analyze an image to be printed by the printer, and obtain an image parameter of the image based on the analyzing, and
    generate a query that indicates the image parameter and a print medium; and
    a database to:
    store a plurality of print-mode configurations for the printer, each respective print-mode configuration of the plurality of print-mode configurations having associated therewith a respective measure that represents a suitability of the respective print-mode configuration to print an image having a corresponding image parameter on a corresponding print medium,
    select, responsive to the query, a selected print-mode configuration from the plurality of print-mode configurations based on the image parameter and the print medium indicated by the query and based on comparing relative values of the measures associated with the plurality of print-mode configurations,
    wherein the print engine is to print the image in accordance with the selected print-mode configuration, and
    wherein the instructions are executable on the computer processor to modify the measure associated with the selected print-mode configuration in response to a feedback about the printed image printed by the print engine using the selected print-mode configuration.

15. The printer of claim 14, wherein the respective measure associated with each respective print-mode configuration of the plurality of print-mode configurations represents user satisfaction with use of the respective print-mode configuration to print an image having the corresponding image parameter on the corresponding print medium,
wherein the modifying of the measure associated with the selected print-mode configuration produces a modified measure that represents a different user satisfaction.

16. The printer of claim 14, wherein the measure associated with the selected print-mode configuration has a highest value from among multiple print-mode configurations of the plurality of print-mode configurations that satisfy the query.

17. A method of a system comprising a hardware processor, comprising:
analyzing an image to be printed by a printer to obtain an image parameter of the image;
querying a database using a query that indicates the image parameter and a print medium, the database storing a plurality of print-mode configurations for the printer, each respective print-mode configuration of the plurality of print-mode configurations having associated therewith a respective measure that represents a suitability of the respective print-mode configuration to print an image having a corresponding image parameter on a corresponding print medium;
selecting, responsive to the query, a selected print-mode configuration from the plurality of print-mode configurations based on the image parameter and the print medium indicated by the query and based on comparing relative values of the measures associated with the plurality of print-mode configurations; and
modifying the measure associated with the selected print-mode configuration in response to a feedback about a printed image printed by the printer using the selected print-mode configuration.

18. The method of claim 17, wherein the measure associated with the selected print-mode configuration has a highest value from among multiple print-mode configurations of the plurality of print-mode configurations that satisfy the query.

19. A non-transitory machine-readable storage medium comprising instructions executable by a processing resource of a computing device to cause the processing resource to:
analyze an image to be printed by a printer to obtain an image parameter of the image;
query a database using a query that indicates the image parameter and a print medium, the database storing a plurality of print-mode configurations for the printer, each respective print-mode configuration of the plurality of print-mode configurations having associated therewith a respective measure that represents a suitability of the respective print-mode configuration to print an image having a corresponding image parameter on a corresponding print medium;
select, responsive to the query, a selected print-mode configuration from the plurality of print-mode configurations based on the image parameter and the print medium indicated by the query and based on comparing relative values of the measures associated with the plurality of print-mode configurations; and
modify the measure associated with the selected print-mode configuration in response to a feedback about a printed image printed by the printer using the selected print-mode configuration.

20. The non-transitory machine-readable storage medium of claim 19, wherein the measure associated with the selected print-mode configuration has a highest value from among multiple print-mode configurations of the plurality of print-mode configurations that satisfy the query.

* * * * *